United States Patent
Nishimoto et al.

[11] Patent Number: 5,712,933
[45] Date of Patent: Jan. 27, 1998

[54] WAVEGUIDE-TYPE OPTICAL DEVICE

[75] Inventors: Hiroshi Nishimoto; Tetsuyuki Suzaki, both of Tokyo, Japan

[73] Assignee: NEC Corporation, Tokyo, Japan

[21] Appl. No.: 388,454

[22] Filed: Feb. 14, 1995

[30] Foreign Application Priority Data

Feb. 24, 1994 [JP] Japan .................................. 6-025822

[51] Int. Cl.$^6$ .................................................. G02F 1/295
[52] U.S. Cl. ........................ 385/9; 385/3; 385/2; 385/14
[58] Field of Search .................................... 385/9, 14, 3, 2, 385/8

[56] References Cited

U.S. PATENT DOCUMENTS

| | | | |
|---|---|---|---|
| 5,074,631 | 12/1991 | Hamano et al. | 385/3 |
| 5,208,697 | 5/1993 | Schaffner et al. | 385/14 X |
| 5,359,680 | 10/1994 | Riviere | 385/9 |
| 5,408,544 | 4/1995 | Seino | 385/3 |

FOREIGN PATENT DOCUMENTS

| | | |
|---|---|---|
| 0 343 939 | 11/1989 | European Pat. Off. . |
| 3-200924 | 9/1991 | Japan . |
| 5-173099 | 7/1993 | Japan . |
| 6-235891 | 8/1994 | Japan . |

OTHER PUBLICATIONS

"High Speed LiNbO$_3$ Modulators and Application", *Second Optoelectronics Conference (OEC'88) Technical Digest*, Oct. 1988, pp. 162–163, Tokyo, Japan.

By T. Kitoh et al., "Modeling and Design of Ti:LiNbO$_3$ Optical Modulator Electrodes with a Buffer Layer", *Electronics and Communications in Japan*, Part II: Electronics, Jan. 1993, vol. 76, No. 1, pp. 25–33.

*Primary Examiner*—Phan T. H. Palmer
*Attorney, Agent, or Firm*—Young & Thompson

[57] ABSTRACT

A waveguide-type optical device includes a substrate with an electro-optical effect, two adjacent optical waveguides, a signal electrode covering either of the optical waveguides and an earth electrode covering the other optical waveguide and having a segment of the same form as the signal electrode which lies close to the other optical waveguide.

17 Claims, 4 Drawing Sheets

WAVEGUIDE-TYPE OPTICAL DEVICE

BACKGROUND OF THE INVENTION

1. Field of the Invention

The present invention relates to a waveguide-type optical device, and particularly to a waveguide-type optical device which is used for modulation of light waves, switching between optical paths, etc. using electrical signals in the microwave band.

2. Description of the Related Art

Waveguide-type optical devices, particularly waveguide-type optical devices with waveguides fabricated on a substrate of ferroelectric crystals such as $LiNbO_3$ crystals, have the excellent characteristics of low optical absorption, low loss and high performance, and a wide variety of waveguide-type optical devices have been reported including directional coupler type modulator-optical switches, Mach-Zehnder type optical modulators, balanced bridge type light modulator-optical switches, total reflection type switches, etc.

Characteristics required of such waveguide-type optical devices include a broadband, low moduration voltage, low crosstalk, low loss, and operational stability against changes in environmental conditions such as temperature variations and impact. Among them, it is particularly important to ensure operational stability over the broadband against changes in environmental conditions such as temperature variations and impact.

FIG. 1A and FIG. 1B are a plan view and a cross-sectional view of a conventional Mach-Zehnder modulator, respectively. This conventional waveguide-type optical device is described in Nakajima, "HIGH SPEED $LiNbO_3$ MODULATORS AND APPLICATION", Second Optoelectronics Conference (OEC '88) Technical Digest, pp. 162–163, 3C1-1, Oct., 1988.

The conventional waveguide-type optical device described therein comprises a z-plate (z-cut) $LiNbO_3$ substrate 1; two Y-branch optical waveguides 6a and 6b fabricated in the surface of the substrate; and two arm optical waveguides 2a and 2b fabricated in the surface of the substrate which connect the two Y-branch waveguides. In addition, a buffer layer 3 is placed overlaying the substrate 1, the Y-branch optical waveguides 6a and 6b and the arm optical waveguides 2a and 2b. Furthermore, placed on the buffer layer are a signal electrode 4a which covers the arm optical waveguide 2a via the buffer layer; and an earth electrode 4b which covers the arm optical waveguide 2b via the buffer layer.

The two Y-branch optical waveguides and the two arm optical waveguides make up a Mach-Zehnder type optical circuit. The buffer layer 3 is placed to prevent absorption of light by the metal electrodes 4a and 4b. Gold is employed for the fabrication of the electrodes 4a and 4b.

Here it is notable that the electrode arrangement of the conventional waveguide-type optical device is not symmetric with respect to the two arm optical waveguides 2a and 2b. More specifically, the signal electrode 4a is fabricated on one of the arm optical waveguides 2a, with a width roughly identical to that of the arm optical waveguide 2a; that is, the two edges of the signal electrode 4a are located in the vicinity of the arm optical waveguide 2a. On the other hand, the other arm optical waveguide 2b is fabricated in such a manner that only one edge thereof lies near the arm optical waveguide 2b.

Suppose the device shown in FIG. 1A and FIG. 1B undergoes distortion due to temperature variation or extraneous impact. The distortion will be focused on the edges of the signal electrode 4a and earth electrode 4b. The distortion produces photoelastic and other effects which cause changes in the refractive index of the part of the electro-optic crystal substrate which is close to the edges of the signal electrode 4a and earth electrode 4b under distortion, that is, in the vicinity of the two arm optical waveguides 2a and 2b. As a result, the propagation constants of the two optical waveguides 2a and 2b also change. Since the electrodes 4a and 4b fabricated over the two optical waveguides 2a and 2b have different structures along the waveguides, more specifically, since the two arm optical waveguides 2a and 2b have a different positional relationship with the edges of their respective counterpart electrodes 4a and 4b, the two arm optical waveguides 2a and 2b undergo different changes in their propagation constants due to distortion. The different propagation constants of the two arm optical waveguides 2a and 2b provide applied voltage-dependent optical output characteristics which are equivalently parallel along the axis of applied voltages, resulting in changes in the extinction ratio and in shifting of the operating point of the high-speed optical modulator. Thus, with the electrode arrangement of conventional high-speed optical modulators which are driven by electric signals in the microwave band, problems occur such as changes in the extinction ratio and shifts in the operating point in response to temperature variation, extraneous impact, etc.

SUMMARY OF THE INVENTION

Accordingly, it is an object of the present invention to provide a waveguide-type optical device which operates in a stable manner against environmental changes including temperature variations and impact.

According to the present invention, there is provided a waveguide-type optical device comprising:

a substrate which has an electro-optical effect;

an optical circuit comprising two adjacent optical waveguides which are formed on the surface of the substrate;

a first electrode which covers a first optical waveguide, or either of the two optical waveguides, and supplies an electric signal; and a second electrode which covers a second optical waveguide, or the rest of the two optical waveguides, wherein the form of the segment of the second electrode which covers the second optical waveguide is identical to that of the first electrode.

With waveguide-type optical devices according to the present invention, operational stability is achieved against changes in environmental conditions such as temperature variations, impact, etc. while maintaining the broadband characteristics. More specifically, the stability in operation according to the present invention results from the fact that, a non-conventional structure is employed; part of which entrails a modification of the conventional ground electrode which is adapted to provide the two arm optical waveguides with identical distortions, and the rest of which is a duplicate of the conventional electrode structure in order not to deteriorate the broadband characteristics.

BRIEF DESCRIPTION OF THE DRAWINGS

Other objects, features and advantages of the present invention will become more apparent when the following description is read in conjunction with the accompanying drawings, wherein:

FIGS. 1A and 1B are views which show the construction of a conventional waveguide-type optical device, wherein FIG. 1A is a plan view and FIG. 1B is a cross-sectional view;

In these figures, the same reference characters depict the same parts, respectively.

DESCRIPTION OF THE PREFERRED EMBODIMENTS

Figure 1A:
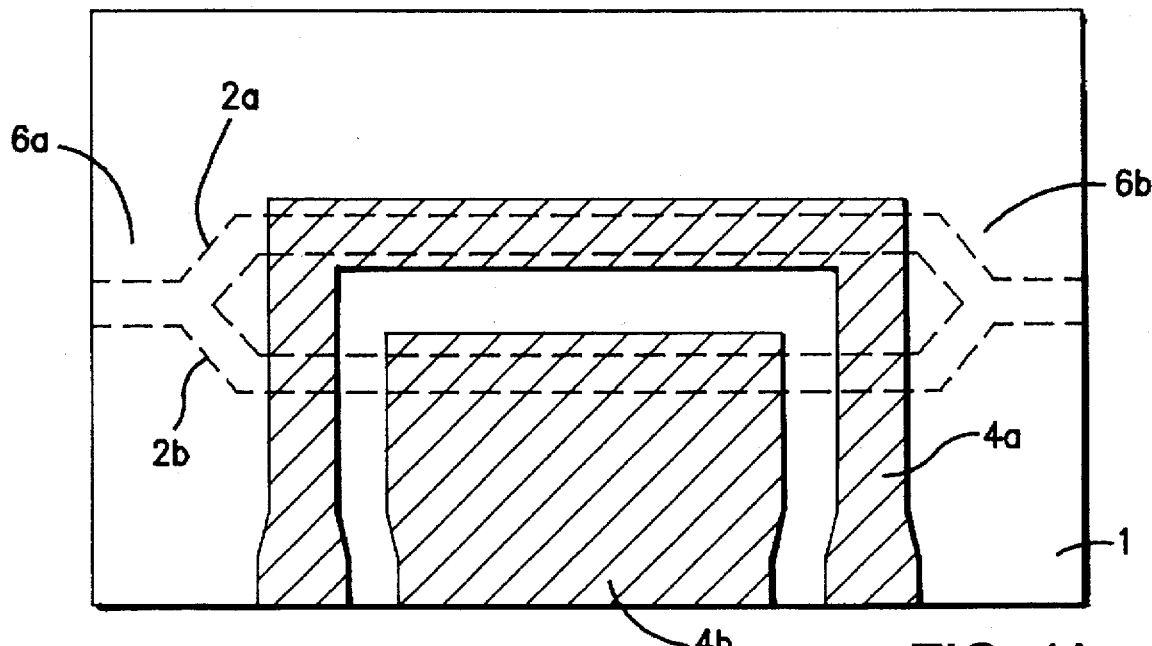
Figure 1B:
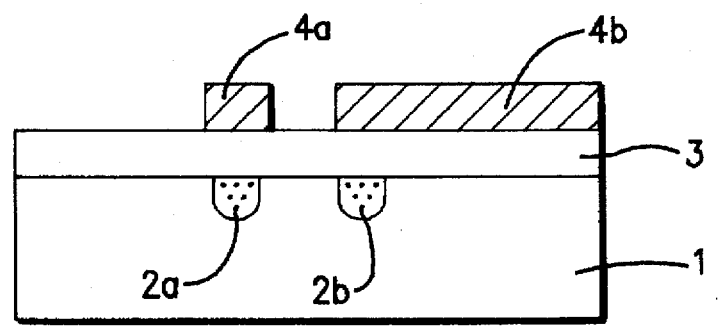
Figure 2:
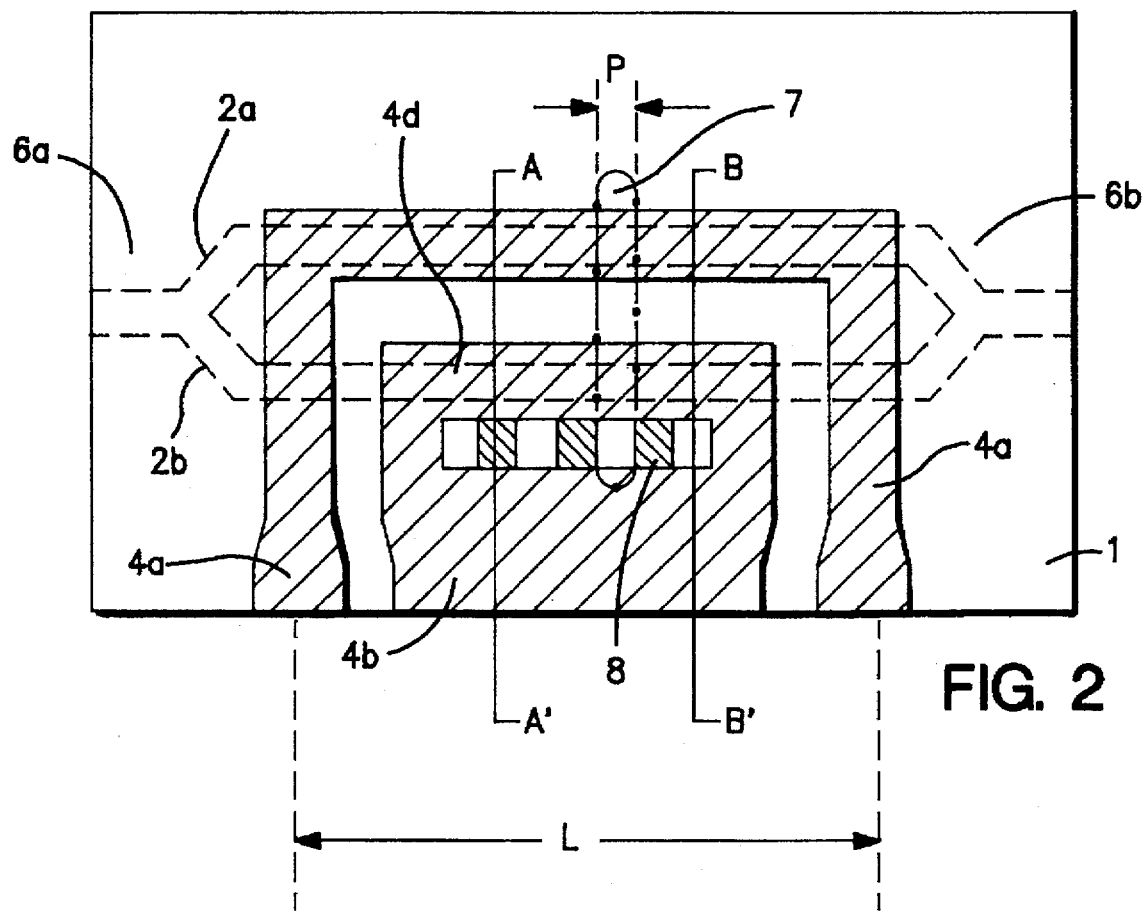
FIG. 2 is a plan view which shows a first embodiment of a waveguide-type optical device according to the present invention.
Figure 3A:
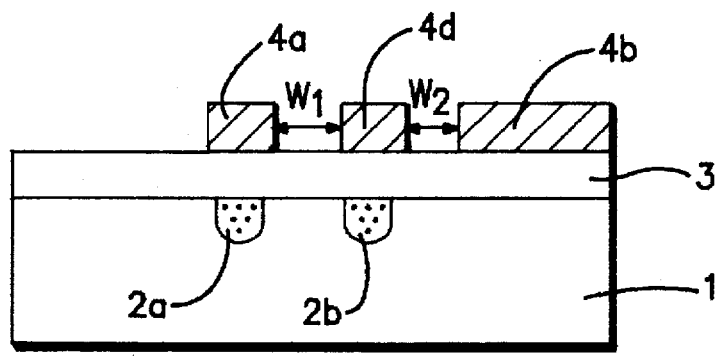
FIG. 3A is a cross-sectional view of the first embodiment which is taken on line B-B' in FIG. 2.
Figure 3B:
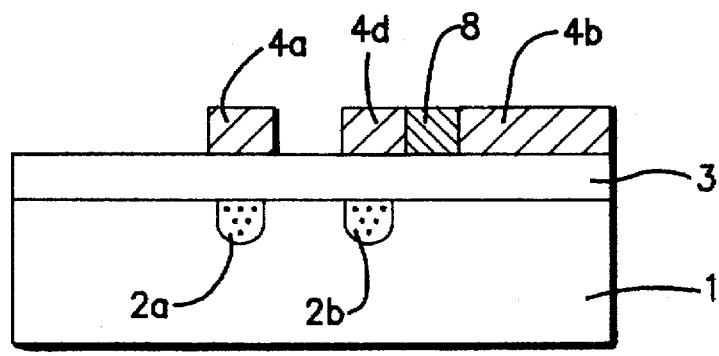
FIG. 3B is another cross-sectional view of the first embodiment which is taken on line A-A' in FIG. 2.

An explanation will now be given regarding a first embodiment of the present invention with reference to FIG. 2, FIG. 3A and FIG. 3B. FIG. 2 is a plan view which shows the first embodiment, while FIG. 3A is a cross-sectional view taken on line A-A' in FIG. 2, and FIG. 3B is a cross-sectional view taken on line B-B' in FIG. 2.

As shown in these drawings, the first embodiment comprises:

a z-cut $LiNbO_3$ substrate 1;

two Y-branch optical waveguides 6a and 6b fabricated in the surface of the substrate;

two arm optical waveguide 2a and 2b fabricated in the surface of the substrate which connects between the two Y-branch waveguides;

a buffer layer 3 which lies overlaying the two Y-branch optical waveguides 6a and 6b, the two arm optical waveguides 2a and 2b, and the surface of the substrate 1;

a signal electrode 4a which covers the arm optical waveguide 2a via the buffer layer 3 and supplies electric signals in the microwave band;

an earth electrode 4b which covers the arm optical waveguide 2b via the buffer layer 3, and part of which is hollowed out in the vicinity of the arm optical waveguide 2b in such a manner that the resulting segment 4d of the earth electrode 4b which lies immediately over the waveguide 2b (hereunder referred to as the "smaller earth electrode") is provided with the same form as of the signal electrode 4a; and an earth connector section 8 which is received in the resulting through-hole and connects between the smaller earth electrode 4d over the arm optical waveguide 2b and the rest of the earth electrode 4b.

Here, the buffer layer 3 consists mainly of $SiO_2$ or a congener thereof, nevertheless, comprises $Al_2O_3$, $MgF_2$, SiON, $Si_3N_4$, etc. as well, with a thickness on the order of 0.2–2 µm. The electrodes 4a and 4b and the earth connector section 8 consist mainly of Au which, however, may be replaced by another materials such as Al, Mo, ITO or ZnO, a conductive polymer, etc., from about 1 µm to 30 µm in thickness. A thick metal film is usually deposited by plating, but may also be applied by vapor deposition, sputtering or the like.

Referring to FIG. 2, a region is formed wherein the electrode arrangement is symmetric with respect to the two arm optical waveguides 2a and 2b. Concretely, the earth electrode 4b constructed over the optical waveguide 2b has a structure wherein a through-hole is made in a part thereof so that a part of the ground electrode 4b, or the smaller earth electrode 4d, has the same width as of the signal electrode 4a.

The cross-sectional view of the device taken on line B-B' in FIG. 2 is shown in FIG. 3A. As shown in FIG. 3A, a gap width $W_1$ between the signal electrode 4a and the smaller earth electrode 4d is substantially the same as a gap width $W_2$ between the smaller earth electrode 4d and the earth electrode 4b. In the embodiments, $W_1$ and $W_2$ may be in the range of 5–40 µm.

In the region defined by the electrodes 4a and 4d shown in FIG. 2, there is provided a site 7 in which the electrode arrangement is symmetric with respect to the two optical waveguides (hereunder referred to as the "electrode-symmetric site"), in which site identical degrees of distortion are applied to the two optical waveguide 2a and 2b even when distortion occurs due to temperature variations, extraneous impact or the like, and thus no difference occurs between the propagation constants of the two optical waveguides 2a and 2b.

As a result, optical waveguide-type devices according to the present invention which comprise even a trace of such electrode-symmetric structure operate in a more stable manner with fewer changes in extinction ratios and fewer shifts in operating points than the conventional optical control devices. In addition, regarding high-frequency microwaves, since the smaller earth electrode 4d is connected with the adjacent earth electrode 4b, the characteristics of the frequency band are less impaired.

FIG. 3B is a cross-sectional view of the first embodiment taken on line A-A' in FIG. 2, or a cross-sectional view of the first embodiment without the electrode-symmetric site 7. In this embodiment, the earth electrode 4b and smaller earth electrode 4d are connected through the earth connector section 8. This earth connector section may be formed by lithographic techniques simultaneously with the other electrodes. The section may also be formed by optical CVD after the formation of the other electrodes.

All that is needed to establish more stable operation is to increase the area of the electrode-symmetric site 7. In this connection, however, the present inventors have found that the earth electrode 4d close to the signal electrode 4a cannot function as the earth for microwaves in cases where the length P of the electrode-symmetric site 7 is longer than half the wavelength of the microwave propagating through the signal electrode 4a which drives the optical control device. Therefore, in such cases a plurality of electrode-symmetric sites 7 are provided to make the length P each of the electrode-symmetric sites 7 shorter than half the wavelength of the microwave when it propagates through the signal electrode 4a. If this requirement is satisfied, then the microwave propagating the signal electrode cannot be induced to the smaller earth electrode; actually no impairment of the characteristics of the frequency band was observed when the requirement was met. Thus, according to the present invention, there is provided a high-speed optical control device which operates in a stable manner against changes in environmental conditions such as temperature variations or impact, while maintaining high-speed operation over the frequency band.

Figure 4:
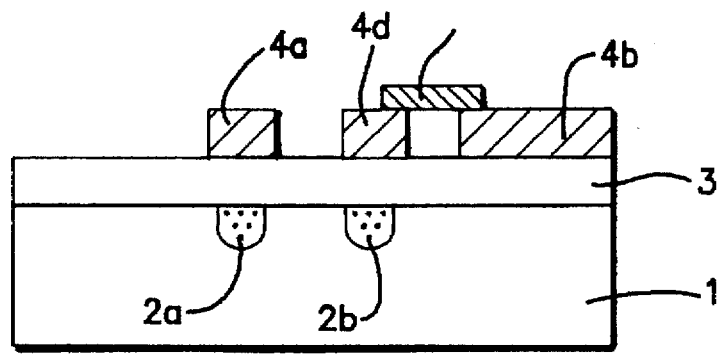
FIG. 4 is a cross-sectional view of a second embodiment of the present invention.

Next, reference is made to FIG. 4 which is a cross-sectional view showing the earth connector section 8 of a second embodiment of the present invention. The plan view of the second embodiment is identical to FIG. 2. Also, the cross-sectional view of the electrode-symmetric site 7 is identical to FIG. 3A. In this embodiment, an aerial wire is used as the earth connector section 8, through which the earth electrode 4b and smaller earth electrode 4d are connected to each other. A gold ribbon connector or the like may be employed for the formation of the earth connector section 8. According to the present embodiment, since the distortions applied to the two optical waveguides 2a and 2b are symmetric over the entire electrode region, there is provided a high-speed waveguide-type optical control device which operates in a more stable manner than the first embodiment, against changes in environmental conditions such as temperature variations or impact, while maintaining high-speed operation over the frequency band.

Figure 5:
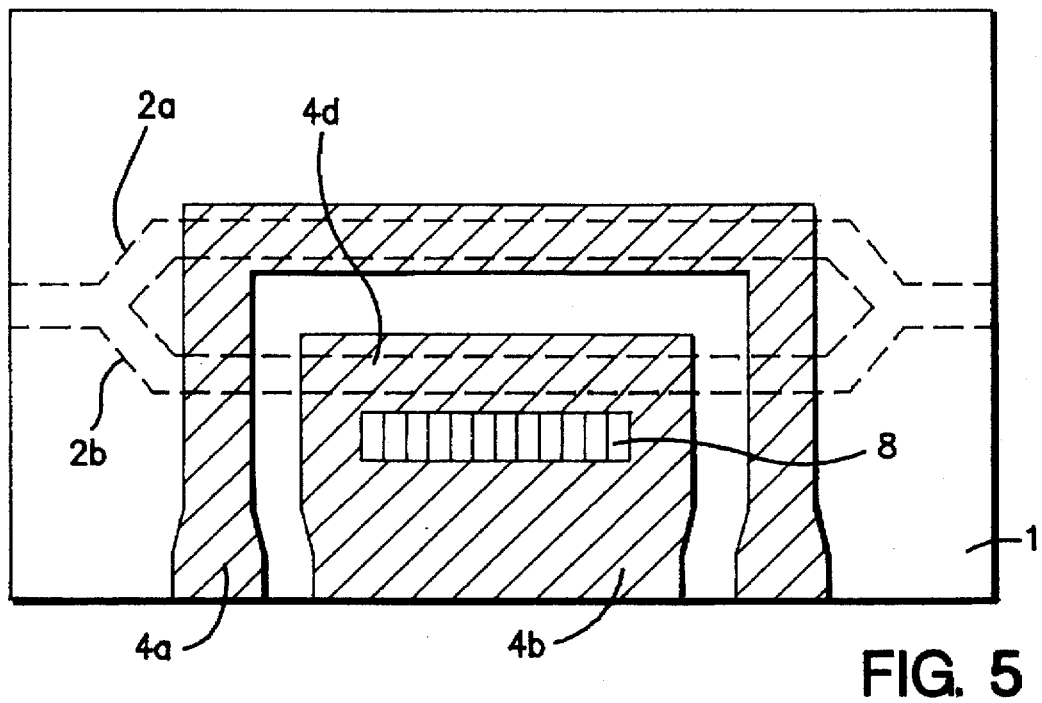
FIG. 5 is a plan view of a third embodiment of the present invention.

FIG. 5 is a plan view which shows a third embodiment of the present invention. Also in the third embodiment, the earth connector section 8 is realized by aerial wiring in the same manner as in the second embodiment. The only difference between the second and third embodiments is that the earth connector section 8 is formed with a gold ribbon in the second embodiment, whereas the means is a bonding wire in the third embodiment. Since a bonding wire is lighter than a gold ribbon as is well known, dynamic boundary conditions of the edge section of the signal electrode 2a and those of the edge section of the earth electrode 2b may be made closer in the third embodiment than in the second embodiment. This means that the present embodiment provides a waveguide-type optical device which operates in a more stable manner than the second embodiment against changes in environmental conditions.

In the above embodiments, a micro-strip line type structure is adopted as an electrode arrangement. However, a co-planer arrangement may be also adopted in the invention as the electrode arrangement as shown in FIGS. 6 and 7, which shows a fourth and fifth embodiments of the invention.

Figure 6:
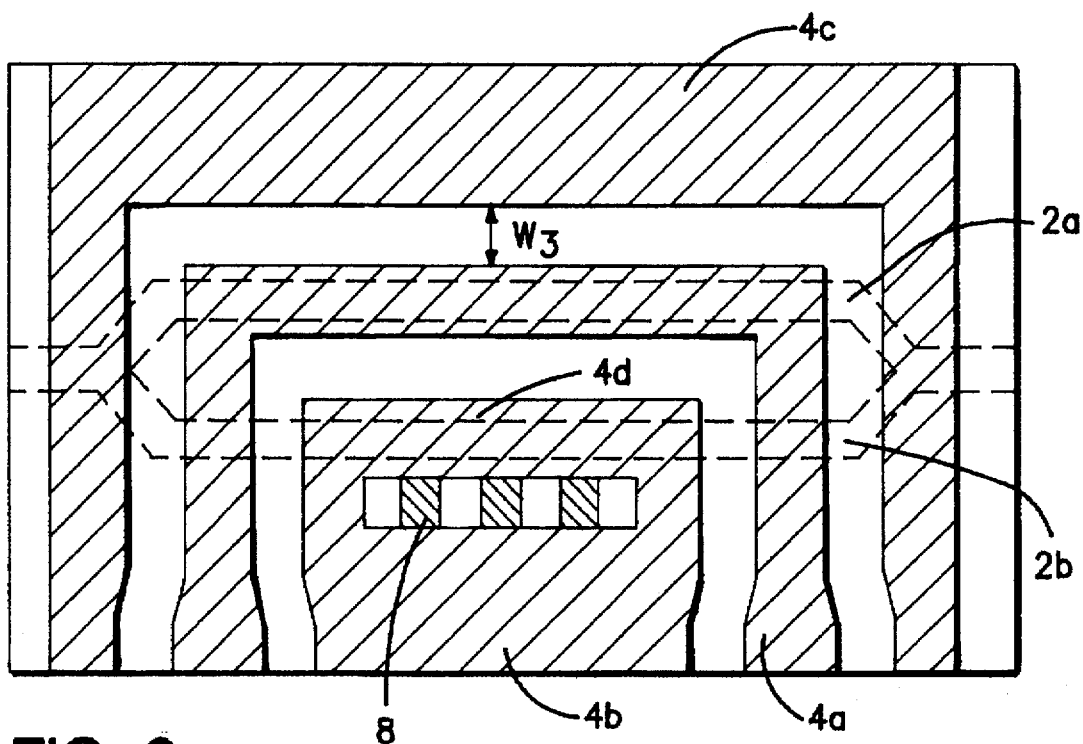
FIG. 6 is a plan view of a fourth embodiment of the present invention.
Figure 7:
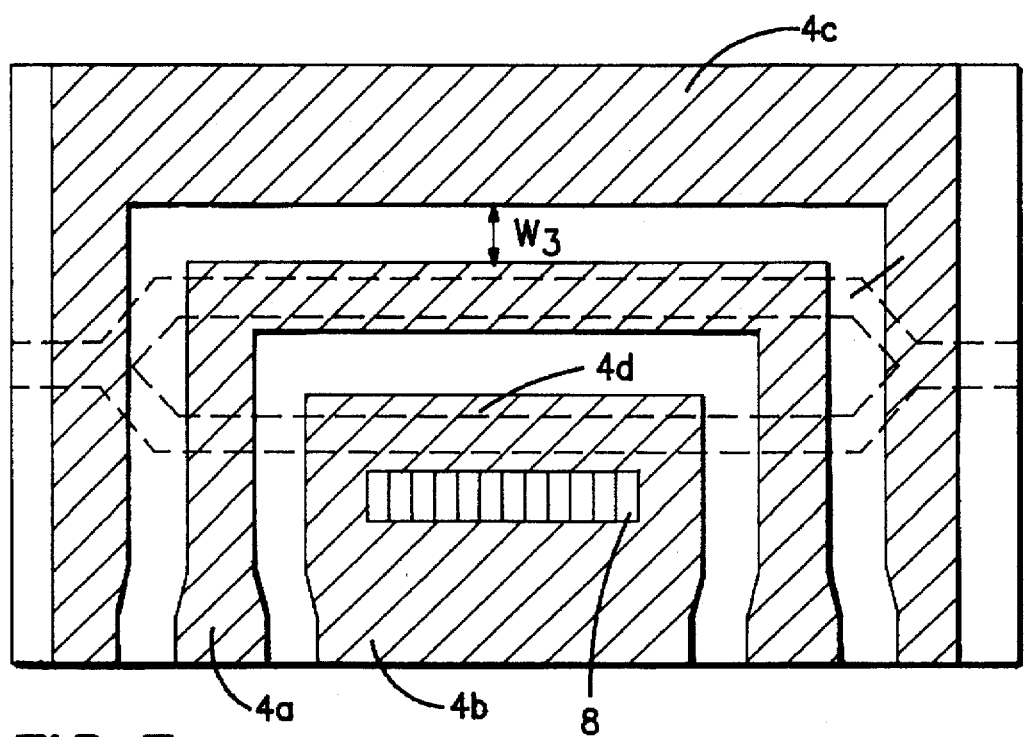
FIG. 7 is a plan view of a fifth embodiment of the present invention.

In FIGS. 6 and 7, an additional earth elecrode 4c is added to the first and second embodiments, respectively. The additional earth electrode is placed near the electrode 4a with a gap width $W_3$ which equals or nearly equals to $W_1$ and $W_2$. Since the fourth and fifth embodiments provide more symmetrical electode arrangement than the first-to-third embodiments, the fourth and fifth embodiments provide more stable device against changes in environmental condition.

In the foregoing explanation, the detailed explanation of the present invention was given with reference to a Mach-Zehnder type optical modulator as an example; nevertheless, the present invention may undoubtedly be readily applied to other types of waveguide-type optical devices, including directional coupler type and balanced bridge type ones, for example.

What is claimed is:

1. A waveguide-type optical device comprising:
   a substrate which has an electro-optical effect;
   an optical circuit comprising two adjacent optical waveguides which are formed on the surface of said substrate;
   a first electrode which covers a first optical waveguide, or either of said two optical waveguides, and supplies an electric signal; and
   a second electrode which covers a second optical waveguide, or the rest of said two optical waveguides, said second electrode having a through-hole in the vicinity of said second optical waveguide such that the segment of said second electrode which has resulted from the formation of the through-hole and which is close to said second optical waveguide, has the same form as that of said first electrode, a plurality of connector sections being received in said through-hole for the connection of said segment and the rest of said second electrode.

2. The waveguide-type optical device as claimed in claim 1, wherein the spaces between the adjacent pairs of said plurality of the connector sections are smaller than half the wavelength of said electric signal when propagating through said first electrode.

3. The waveguide-type optical device as claimed in claims 2, wherein said connector section connects between said segment and said second electrode, without contacting with said through-hole.

4. The waveguide-type optical device as claimed in claim 3, wherein said connector section is a bonding wire.

5. The waveguide-type optical device as claimed in claim 1, wherein said device further comprises a third electrode formed in said substrate near said first electrode with a same gap width as that between said first electrode and said second electrode.

6. The waveguide-type optical device as claimed in claim 5, wherein a plurality of connector sections are received in said through-hole for the connection of said segment and the rest of said second electrode.

7. The waveguide-type optical device as claimed in claim 6, wherein the spaces between the adjacent pairs of said plurality of the connector sections are smaller than half the wavelength of said electric signal when propagating through said first electrode.

8. The waveguide-type optical device as claimed in claims 7, wherein said connector section connects between said segment and said second electrode, without contacting with said through-hole.

9. The waveguide-type optical device as claimed in claim 8, wherein said connector section is a bonding wire.

10. A waveguide-type optical device comprising:
    a substrate which has an electro-optical effect;
    an optical circuit comprising two adjacent optical waveguides which are formed on the surface of said substrate;
    a first electrode which covers a first optical waveguide, or either of said two optical waveguides, and supplies an electric signal;
    a second electrode which covers a second optical waveguide, or the rest of said two optical waveguides, and
    a third electrode formed in said substrate near said first electrode with a same gap width as that between said first electrode and said second electrode,
    wherein the form of the segment of said second electrode which covers said second optical waveguide is identical to that of said first electrode, and said second electrode has a through-hole.

11. A waveguide-type optical device as claimed in claim 10, wherein said through-hole is formed in the vicinity of said second optical waveguide.

12. A waveguide-type optical device comprising:
    a substrate which has an electro optical effect;
    an optical circuit comprising two adjacent optical waveguides which are formed on the surface of said substrate;
    a first electrode which covers a first optical waveguide, or either of said two optical waveguides, and supplies an electric signal;

a second electrode which covers a second optical waveguide, or the rest of said two optical waveguides; and a third electrode formed in said substrate near said first electrode with a same gap width as that between said first electrode and said second electrode, wherein the form of the segment of said second electrode which covers said second optical waveguide is identical to that of said first electrode.

13. The waveguide-type optical device as claimed in claim 12, wherein said second electrode has a through-hole in the vicinity of said second optical waveguide such that the segment of said second electrode which has resulted from the formation of the through-hole and which is close to said second optical waveguide, has the same form as that of said first electrode.

14. The waveguide-type optical device as claimed in claim 13, wherein a plurality of connector sections are received in said through-hole for the connection of said segment and the rest of said second electrode.

15. The waveguide-type optical device as claimed in claim 14, wherein the spaces between the adjacent pairs of said plurality of the connector sections are smaller than half the wavelength of said electric signal when propagating through said first electrode.

16. The waveguide-type optical device as claimed in claim 15, wherein said connector section connects between said segment and said second electrode, without contacting with said through-hole.

17. The waveguide-type optical device as claimed in claim 16, wherein said connector section is a bonding wire.

* * * * *